United States Patent [19]

Takahira

[11] Patent Number: 4,777,355
[45] Date of Patent: Oct. 11, 1988

[54] IC CARD AND SYSTEM FOR CHECKING THE FUNCTIONALITY THEREOF

[75] Inventor: Kenichi Takahira, Itami, Japan

[73] Assignee: Mitsubishi Denki Kabushiki Kaisha, Japan

[21] Appl. No.: 136,548

[22] Filed: Dec. 22, 1987

[30] Foreign Application Priority Data

Dec. 24, 1986 [JP] Japan .................................. 61-314420
Nov. 17, 1987 [JP] Japan .................................. 62-288493

[51] Int. Cl.$^4$ ............................................. G06K 5/00
[52] U.S. Cl. ....................................... 235/380; 235/492
[58] Field of Search ................................. 235/380, 492

[56] References Cited

U.S. PATENT DOCUMENTS 4,742,351 5/1988 Suzuki ............................. 238/380 X Primary Examiner—Harold I. Pitts
Attorney, Agent, or Firm—Leydig, Voit & Mayer

[57] ABSTRACT

An IC card having a built-in microprocessor, a fixed program memory with an extended program memory section, and a programmable memory with an extended programmable memory section. An external program can be temporarily loaded into the extended programmable memory section through the microprocessor under the control of an operating program stored in the extended program memory section. Such an external program may be a test program for checking the functionality of the IC card. The test program once loaded into the programmable memory is preferably erased after execution by the microprocessor so that an unauthorized person cannot easily access data or information stored in the memories from outside the IC card, thereby improving the security.

14 Claims, 3 Drawing Sheets

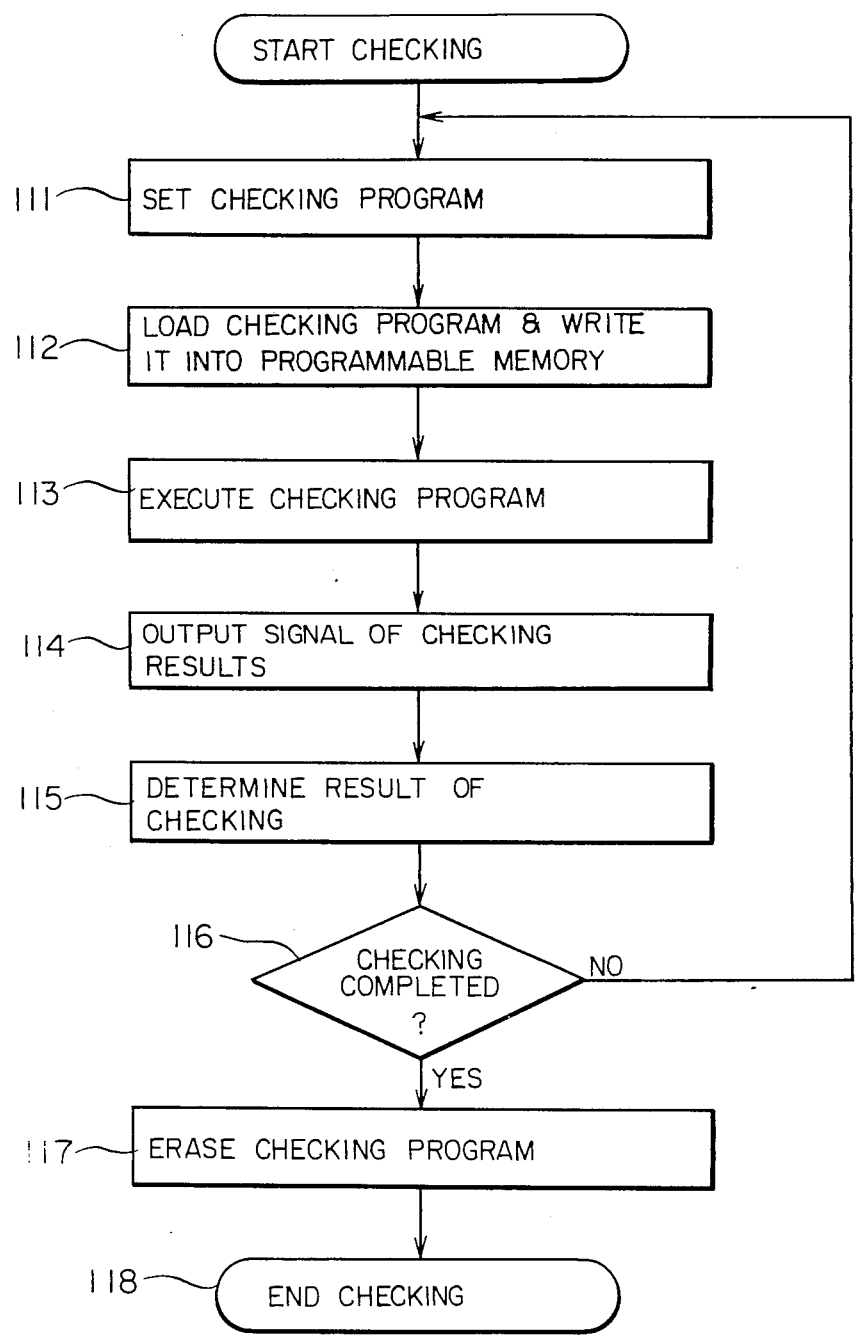

IC CARD AND SYSTEM FOR CHECKING THE FUNCTIONALITY THEREOF

BACKGROUND OF THE INVENTION

The present invention relates to an IC card having various composite functions and a system for checking the functionality thereof.

IC card having built-in microcomputers and memories have recently been proposed and are now being widely used. In many cases, the microcomputer used in an IC card is a one-chip microcomputer which has built-in ROM, RAM, and peripheral circuits. Although the operation of the microcomputer is controlled by the program stored in the built-in ROM, the contents of the ROM are usually created during the production of the IC, and thus cannot be changed once the ROM is built into the IC card. On the other hand, the RAM is usually used for the various registers and flags which are necessary for the operation of the microcomputer, and the data used in the IC card system and the data used for managing memories are stored in an external memory, these items of data being read out and written under the control of the programs in the ROM.

Since conventional IC cards are configured as described above, once the IC cards have been completed, it is impossible to add to or change the programs built into the one-chip microcomputers.

Even in the case where the IC is not a single chip, for example, where the IC card contains a microprocessor on one chip and one or more additional memory chips associated with the microprocessor, many of the above problems still exist. In the one chip embodiment, the data bus interconnecting the operative units is internal to the chip. In the multiple chip case, the data bus must be brought external to the chips so that the chips can be interconnected, but it is still preferable to maintain the data bus within the card so that it is inaccessible from outside the card. Isolating the data bus in that way is important for protecting the card in the first instance, i.e., for preventing damage resulting from unwanted signals imposed on sensitive portions of the IC, but more importantly from a security standpoint, i.e., maintaining the secrecy and integrity of the information stored in the IC card. Thus, both categories of IC cards share the characteristic of having a relatively small fixed program memory which is not easily changed, and a relatively small associated programmable memory for storing temporary results, but not directly accessible to the environment outside the IC card.

In addition, a convenient feature to incorporate into each IC card may be a checking program for checking the functions of the IC card, so that a functional check could be performed by utilizing this program during the checking process. However, it is difficult to build such a checking program into a conventional IC card because of limits on program capacity heretofore encountered.

SUMMARY OF THE INVENTION

The present invention has a general aim of solving the above-described problems, and it is an object of the present invention to provide an IC card in which, after the manufacture of the IC card is completed, an external program can be freely loaded from an external device for execution by the microcomputer built into the IC card.

Another object of the present invention is to provide an IC card and a system for checking the functionality thereof having improved security, which isolate the memories built into the IC card from direct access from outside the IC card, thereby protecting the data and information stored in the IC card memories.

In order to achieve the above objects, according to one aspect of the present invention, in an IC card comprising a wallet sized planar rectangular information carrying card having an on-board microprocessor, an on-board fixed program memory and an on-board programmable memory arranged to execute programs stored in the fixed program memory, there is provided the improvement which comprises extended programmable memory means for receiving a supplemental operating program from an external device, extended program memory means containing instruction codes for controlling the microprocessor to accept code comprising the supplemental operating program from the external device and load the accepted code into the extended programmable memory, and control means for switching between two operating modes of the microprocessor, a first mode for accepting and loading the program into the extended programmable memory means, and a second mode for executing the program loaded into the extended programmable memory means.

According to another aspect of the present invention, in an IC card comprising a wallet size planar information carrying card having an on-board microprocessor, an on-board program memory of limited size for storing a sequence of steps for controlling the operation of the on-board microprocessor, and an on-board programmable memory for providing temporary storage of results generated by the microprocessor, a data bus interconnecting the microprocessor, the program memory and the programmable memory, the data bus being confined within the IC card and therefore inaccessible by direct means outside the IC card, there is provided a system for checking the functionality of the IC card which comprises a checking program having a sequence of program steps, the size of the checking program being incompatible with the limited size of the program memory of the IC card, means associated with the on-board microprocessor for accepting the program code of the checking program from an external device and temporarily loading the accepted program code into the programmable memory, means for executing the checking program code for checking the functionality of the IC card and providing an output signal indicating the functionality of the IC card, and means for erasing the checking program thereby to render the programmable memory available for receiving temporary information from the microprocessor in normal operation of the IC card.

In the present invention, since the program code loaded from the external device is stored in the programmable memory and the stored program code is fetched and executed by the built-in microcomputer, functions of the card can be improved or added, for example, by incorporating a checking program for checking the various functions of the IC card.

BRIEF DESCRIPTION OF THE DRAWINGS

FIG. 3 is a flow chart showing the operating process of the IC card executed by a checking program stored in an extended programmable memory section.

DESCRIPTION OF THE PREFERRED EMBODIMENT

An embodiment of the present invention is described below with reference to the drawings.

Figure 1:
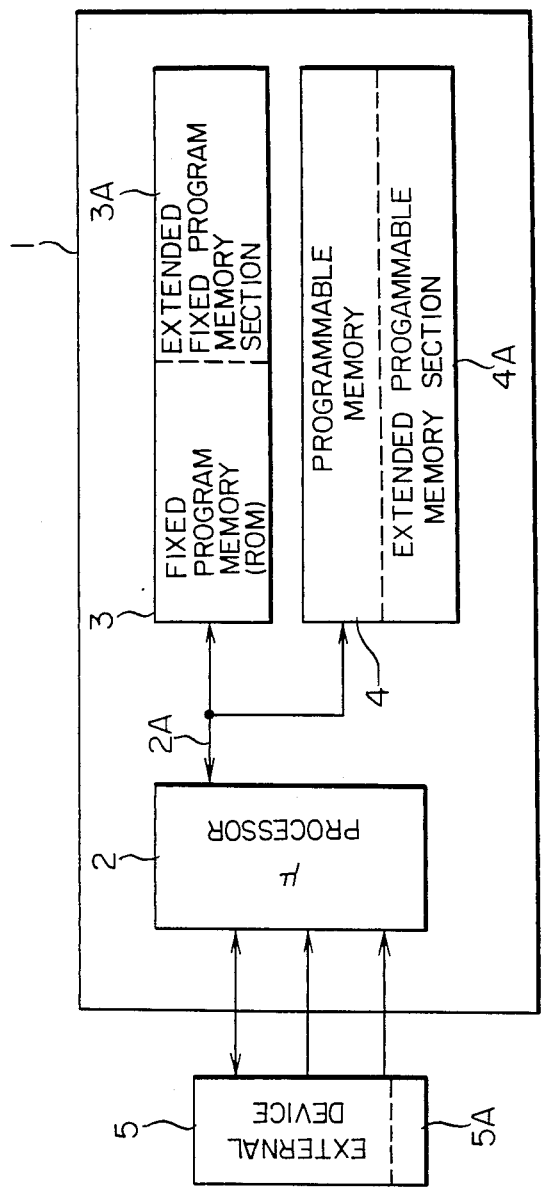
FIG. 1 is a functional block diagram of an IC card in accordance with an embodiment of the present invention.

An IC card is schematically illustrated in FIG. 1. As is well known, the IC card is an information carrying device in the form of a thin, rectangular wallet-sized card (not unlike a credit card) but including a built-in or on-board microprocessor 2, a fixed program memory typically in the form of a read only memory (ROM) 3 and a temporary or read/write memory conventionally termed programmable memory 4. The microprocessor 2 and its associated on-board memories 3, 4 are connected by a data bus 2A which, as described above, is isolated within the IC card 1, and is not directly accessible from outside the IC card.

Typically, the IC card 1 is connected to an external device such as a reader/writer or terminal such that the card and terminal combination allow the user to perform whatever transaction or access whatever service available from the card system. In the FIG. 1 embodiment, however, the IC card 1 is connected to an external device 5 which is also a store for additional programs, such added storage of programs being denoted by dashed rectangle 5A. As will become more apparent, the programs within the store 5A are adapted to be transferred to the IC card 1 via the microprocessor 2 for execution on the IC card. Of course the program memory 3 contains one or more resident fixed programs which are executed by the IC card in performing its normal function in a normal operating mode.

In practicing the invention, the fixed program memory or ROM 3 additionally includes an extended program memory section 3A containing additional instruction codes which control the microprocessor 1 to accept code in the form of supplemental programs from the external device 5A, and to load the accepted code into the programmable memory 4. To that end, the programmable memory 4 includes an extended programmable memory section 4A for receiving a supplemental operating program from the external device 5 via the microprocessor 2 under the control of the ROM 3. The extended program memory section 3A also contains control code or control means associated with the microprocessor 2 and its associated memories so that it causes the system to switch between two additional operating modes, a first such mode for accepting and loading the program into the extended programmable memory section 4A, and a second mode for executing the program which has been loaded into the extended programmable memory section 4A.

While FIG. 1 shows the extended program memory section 3A and extended programmable memory section 4A as segregatable from the main program memory 3 and programmable memory 4, that illustration is primarily as an aid in understanding the present invention. The extended sections of memories will typically be physically on the same integrated circuit chip as their associated memories, and the segregation will typically be by means of segregating a block of locations or addresses within the memory for the assigned functions.

Figure 2:
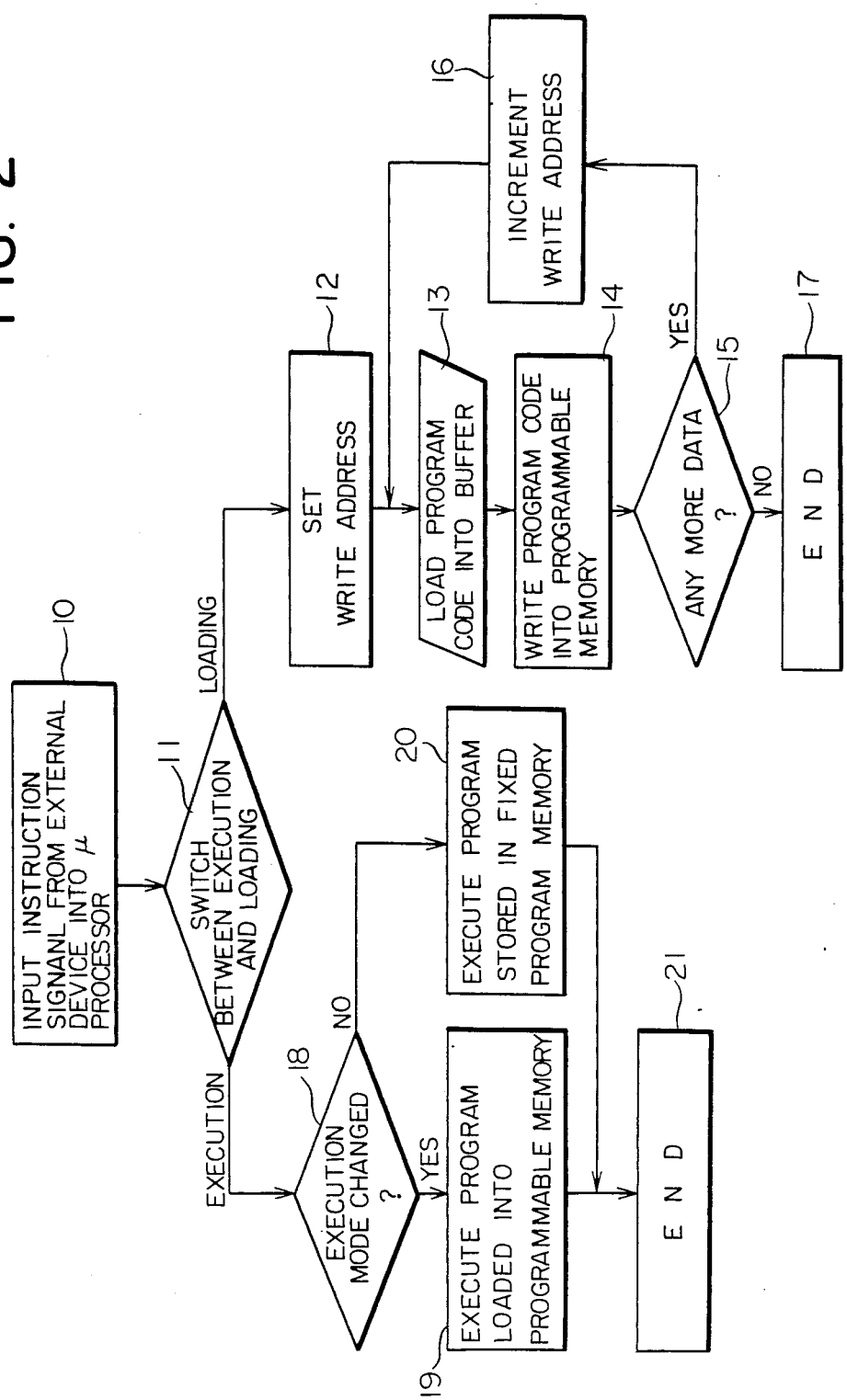
FIG. 2 is a flow chart showing the operating process of the IC card in accordance with the present invention.

Description will now be made of the operation of the IC card 1 as constructed above with reference to FIG. 2.

First, in Step 10, an electrical instruction signal, typically a signal indicating an external device is prepared to load a supplemental program, is sent from the external device 5 to the microprocessor 2, and then in Step 11, the above-mentioned control code or control means stored in the extended fixed program memory section 3A switches the operating mode of the microprocessor 2 between the execution mode and the loading mode on the basis of the instruction signal given by the external device 5. When the microprocessor 2 is switched into the loading mode, the operation process proceeds to Step 12 where the microprocessor 2 calls up and starts to execute the loading/writing program stored in the extended program memory section 3A whereby a write address in the extended programmable memory section 4A is set. Thereafter, in Step 13, program code is loaded from the external device 5 into a buffer which is associated with the microprocessor 2 and typically is a part of the microprocessor 2. In Step 14, the loaded program code is written into that address position in the extended programmable memory section 4 set in Step 12. In Step 15, the microprocessor 2 determines whether there is still any more data, i.e., additional program code, to be read, and, if there is no subsequent data, the process proceeds to Step 17 where the operation of the microprocessor 2 is ended or returned to an original state. On the other hand, if there is data in Step 15, the write address is incremented in Step 16, and Steps 13 to 15 are repeated until the entire supplemental program has been loaded.

In this connection, it is to be noted that in some case, though not illustrated in FIG. 2, it is possible to automatically or continuously execute the supplemental program thus loaded into the programmable memory immediately after the end of such a loading, as will be described later with reference to FIG. 3.

On the other hand, turning to Step 11, when the microprocessor 2 is switched into the execution mode, the process proceeds to Step 18 where it is determined whether the execution mode of the microprocessor 2 is changed from a first or normal execution mode into a second or special execution mode. If so, the microprocessor 2 calls up and executes an appropriate program which has been loaded from the external device 5 into the extended programmable memory section 4A. However, if not in Step 18, the process proceeds to Step 20 where the microprocessor 2 calls up and executes an application program which is stored in the fixed program memory 3. Finally, the process proceeds from Step 19 or 20 to Step 21 where the operation of the microprocessor 2 is ended or returned to an original state. Of course, the steps of FIG. 2 are only exemplary of the broader application of the invention, where the IC card normally executes internally stored programs on demand, and when required by an external device, loads programs from that device into the programmable memory in one additional operating mode, and executes those programs in another operating mode.

It will now be apparent that what has been provided is an IC card which allows the loading and execution of external programs without significantly compromising the security of the card. While the programs are loaded in predetermined areas of the programmable memory 4 under the control of the program memory 3, all of the access to the programmable memory 4 is by way of the microprocessor 2. The data bus 2A which connects the microprocessor 2 to its associated memories is internal to the IC card 1, and accessible by normal means in program operation. Information stored within the programmable memory 4 is difficult, if not impossible, to access except by authorized means since the microprocessor 2 and its operating programs contained within the ROM 3 control all such access.

Among the programs which can be stored within an external device 5 for loading into the IC card 1 are supplemental operating program occasioned by changes in the IC card system which it is found desirable to make, but not at the expense of reissuing all IC cards in the system with updated memories. Thus, an external device 5 such as a reader/writer can be used to load an external operating program into a dedicated portion of the programmable memory 4, and that program can be called as necessary when using the IC card in the card system.

As a second example, testing of the IC card to assure its meeting of standards is desirable before issuance of the card. To assist in the testing or checking of cards, a supplemental program is loaded from an external device 5 into the IC card for testing or checking the functionality of the internal components. For example, the program can individually test all of the cells within the programmable memory, test the various functions of the microprocessor, and test the integrity of the fixed operating program, as a means for assuring that the IC card passes checking before its issuance. It is emphasized that such checking can be accomplished without the need, heretofore believed necessary when using an extended test program, of making the internal data bus 2A directly accessible to devices which are external to the IC card 1.

Now, one example of such a checking of the functionality of the IC card will be described with reference to FIG. 3.

First in Step 111, a checking program for checking certain functions selected as desired of the IC card 1 is set into or accessed from the external device 5. Subsequently, in Step 112, the checking program is loaded into the extended programmable memory section 4A, as described above, typically one byte or group of bytes at a time, until the entire supplemental program is resident in the extended ssection of the programmable memory. In Step 113, the checking program thus loaded is executed by the microprocessor 2 in the following manner. Specifically, "0" is first written as initial data into all the memory cells to be tested in the IC card 1, and data thus written in the first one of the addresses is read out and it is checked or determined whether the data thus read out is "0". Then, the address to be checked is incremented one by one and the same checking process is repeatedly carried out until the last address is reached. In this case, if the above checking process proceeds normally throughout all the memory cells, all the data stored therein are converted into "1". Subsequently, the similar checking process is repeated sequentially on all the memory cells by the use of data "1", that is in each cell, it is determined whether the data therein is "1".

Thereafter, in Step 114, the microprocessor 2 sends out an output signal indicative of the results of checking to the external device 5, and in Step 115, the external device 5 analyzes the results of checking so as to determine whether there is an error in any of the memory cells tested. In this connection, it may be determined that the IC card 1 is not in normal operation, for example, if no signal is output from the microprocessor 2 to the external device 5 within a predetermined period of time, or if the content of the output signal from the microprocessor 2 is different from a predetermined content. In addition, the checking program may be constructed such that if any abnormality or error is detected in a specified address during checking, information on the location of the failed address, the expected data value, the measured value and the like can be transmitted to the external device 5 so that the contents or nature of the error can be determined.

In Step 116, it is determined whether or not the checking is completed. If the answer is yes, the process proceeds to Step 117 where the checking program remaining in the programmable memory 4 in the IC card 1 is erased. Thus, it becomes possible to prevent any data or information stored in the memories such as the ROM 3 and the programmable memory 4 from being accessed from outside the IC card, thereby further improving the level of security of the IC card 1.

On the other hand, if it is determined in Step 116 that the checking is not completed, the process returns from Step 116 to Step 111. By repeating Steps 111 to 116, it becomes possible to effect more complicated checking. That is, another checking program to be executed subsequently can be selected on the basis of the results of checking obtained in Step 115 and set into the external device 5 in Step 111. This enables the IC card 1 to be checked with respect to, for instance, an error in detail in specified mode. For instance, when an error has been detected, determining factors of the error, such as the characteristics and type thereof, so as to check the error in detail.

Some examples of the ROM in the foregoing embodiment are a mask ROM, an EPROM, and an EEPROM. Some examples of memories which may be used as the programmable memory are an EEPROM, a CMOS-RAM, and an EPROM.

What is claimed is:

1. In an IC card comprising a wallet sized planar rectangular information carrying card having an on-board microprocessor, an on-board fixed program memory and an on-board programmable memory arranged to execute programs stored in the fixed program memory, the improvement comprising extended programmable memory means for receiving a supplemental operating program from an external device, extended program memory means containing instruction codes for controlling the microprocessor to accept code comprising the supplemental operating program from the external device and load the accepted code into the extended programmable memory means, and control means for switching between two operating modes of the microprocessor, a first mode for accepting and loading the program into the extended programmable memory means, and a second mode for executing the program loaded into the extended programmable memory means.

2. The improvement according to claim 1, wherein said fixed program memory comprises a ROM.

3. The improvement according to claim 2, wherein said ROM is a mask ROM.

4. The improvement according to claim 2, wherein said ROM is an EPROM.

5. The improvement according to claim 2, wherein said ROM is an EEPROM.

6. The improvement according to claim 2, wherein said programmable memory is an EEPROM.

7. The improvement according to claim 1, wherein said programmable memory is a CMOSROM.

8. The improvement according to claim 1, wherein said programmable memory is an EPROM.

9. An IC card comprising in combination an information carrying card in the form of a thin rectangular wallet sized card having an on-board microprocessor, an on-board program memory for storing steps of instructions for carrying out predetermined programs and an on-board programmable memory for storing changable results under the control of the microprocessor, a data bus connecting the microprocessor, the program memory and the programmable memory for exchange of information therebetween, the data bus being confined within the IC card to prevent direct access to the data bus from outside the IC card, means for connecting the IC card to an external device having additional programs stored therein for transfer to the IC card, means within the program memory for assigning a section within the programmable memory for receiving program code from the external device, the program memory including means for causing the microprocessor to load program code from the external device and write said accepted program code into the assigned area of the programmable memory, and control means having a first state for writing program code from the external device into the assigned area of the programmable memory, and a second state for executing the program code stored in the programmable memory.

10. An IC card comprising in combination a wallet sized planar rectangular information carrying card having an on-board microprocessor, an on-board fixed program memory for controlling the operation of the on-board microprocessor, an on-board programmable memory for cooperating with the microprocessor during normal operation for storage of temporary results, an extended programmable memory for receiving a supplemental operating program from an external device under the control of the program memory, an extended program memory including a sequence of instructions for causing the microprocessor to accept code for a supplemental operating program from an external device and load said code into the extended programmable memory, and means for causing the microprocessor to execute the code stored within the extended programmable memory thereby causing the performance of the supplemental program loaded from the external device without making the data bus directly accessible externally of the IC card.

11. In an IC card comprising a wallet size planar information carrying card having an on-board microprocessor, an on-board program memory of limited size for storing a sequence of steps for controlling the operation of the on-board microprocessor, and an on-board programmable memory for providing temporary storage of results generated by the microprocessor, a data bus interconnecting the microprocessor, the program memory and the programmable memory, the data bus being confined within the IC card and therefore inaccessible by direct means outside the IC card, the improvement comprising a system for checking the functionality of the IC card comprising a checking program having a sequence of program steps, the size of the checking program being incompatible with the limited size of the program memory of the IC card, means associated with the on-board microprocessor for accepting the program code of the checking program from an external device and temporarily loading said accepted program code into the programmable memory, means for executing the checking program code for checking the functionality of the IC card and providing an output signal indicating the functionality of the IC card, and means for erasing the checking program thereby to render the programmable memory available for receiving temporary information from the microprocessor in normal operation of the IC card.

12. The system according to claim 11, wherein the output signal from the microprocessor is examined by the external device and a subsequent checking program is loaded from the external device into the programmable memory and executed for more detailed checking.

13. The system according to claim 11, wherein, when the output signal is not input to the external device within a predetermined period of time, it is determined that the operation of the IC card is abnormal.

14. The system according to claim 11, wherein, when the content of the output signal from the microprocessor is different from a predetermined content, it is determined that the operation of the IC card is abnormal.

* * * * *